United States Patent
Roy et al.

(10) Patent No.: US 10,004,242 B2
(45) Date of Patent: Jun. 26, 2018

(54) INFUSION METHODS AND PRODUCTS

(75) Inventors: Soumya Roy, Mars, PA (US); Kellie Denson, Lakeville-Middleboro, MA (US); Harold L. Mantius, Lakeville-Middleboro, MA (US)

(73) Assignee: Ocean Spray Cranberries, Inc., Lakeville-Middleboro, MA (US)

( * ) Notice: Subject to any disclaimer, the term of this patent is extended or adjusted under 35 U.S.C. 154(b) by 0 days. days.

(21) Appl. No.: 13/081,344

(22) Filed: Apr. 6, 2011

(65) Prior Publication Data

US 2011/0256279 A1  Oct. 20, 2011

Related U.S. Application Data

(60) Provisional application No. 61/321,377, filed on Apr. 6, 2010, provisional application No. 61/349,155, filed on May 27, 2010.

(51) Int. Cl.
| A23L 1/31 | (2006.01) |
| A23B 7/08 | (2006.01) |
| A23B 7/158 | (2006.01) |

(52) U.S. Cl.
CPC .............. *A23B 7/085* (2013.01); *A23B 7/158* (2013.01)

(58) Field of Classification Search
CPC ... A23L 1/31445; A23L 1/31436; A23B 4/28; A23B 7/085; A23B 7/08; C08L 5/00
USPC .................................................. 426/261, 281
See application file for complete search history.

(56) References Cited

U.S. PATENT DOCUMENTS

| 3,930,034 | A | 12/1975 | Shanbhag et al. |
| 5,320,861 | A | 6/1994 | Mantius |
| 5,419,251 | A | 5/1995 | Mantius et al. |
| 2005/0186324 | A1 | 8/2005 | Ghaedian et al. |
| 2007/0031552 | A1 | 2/2007 | Bauman et al. |
| 2007/0031553 | A1* | 2/2007 | Sinha ...................... A23B 7/02 426/456 |
| 2011/0256279 | A1 | 10/2011 | Roy et al. |

FOREIGN PATENT DOCUMENTS

| WO | WO 2008/101101 | 8/2008 |
| WO | 2011127198 | 10/2011 |

OTHER PUBLICATIONS

International Search Report and Written Opinion; PCT/US11/31455; dated Aug. 26, 2011 (10 pages).
International Preliminary Report on Patentability issued in PCT/US2011/031455, dated Oct. 9, 2012 (9 pages).
Office Action issued in CL02781-2012 dated Feb. 11, 2014 (8 pages).
Office Action issued in CL02781-2012 dated Jul. 10, 2015 (7 pages).

* cited by examiner

*Primary Examiner* — Katherine D Leblanc
(74) *Attorney, Agent, or Firm* — Fish & Richardson P.C.

(57) ABSTRACT

The present specification provides, e.g., processes for infusing food bodies with infusion formulations, including long chain molecules such as soluble corn fiber, and provides food products infused with such formulations. Also provided are infusion formulations for performing such methods.

12 Claims, 1 Drawing Sheet

Schematic Diagram of the Counter Current Infusion

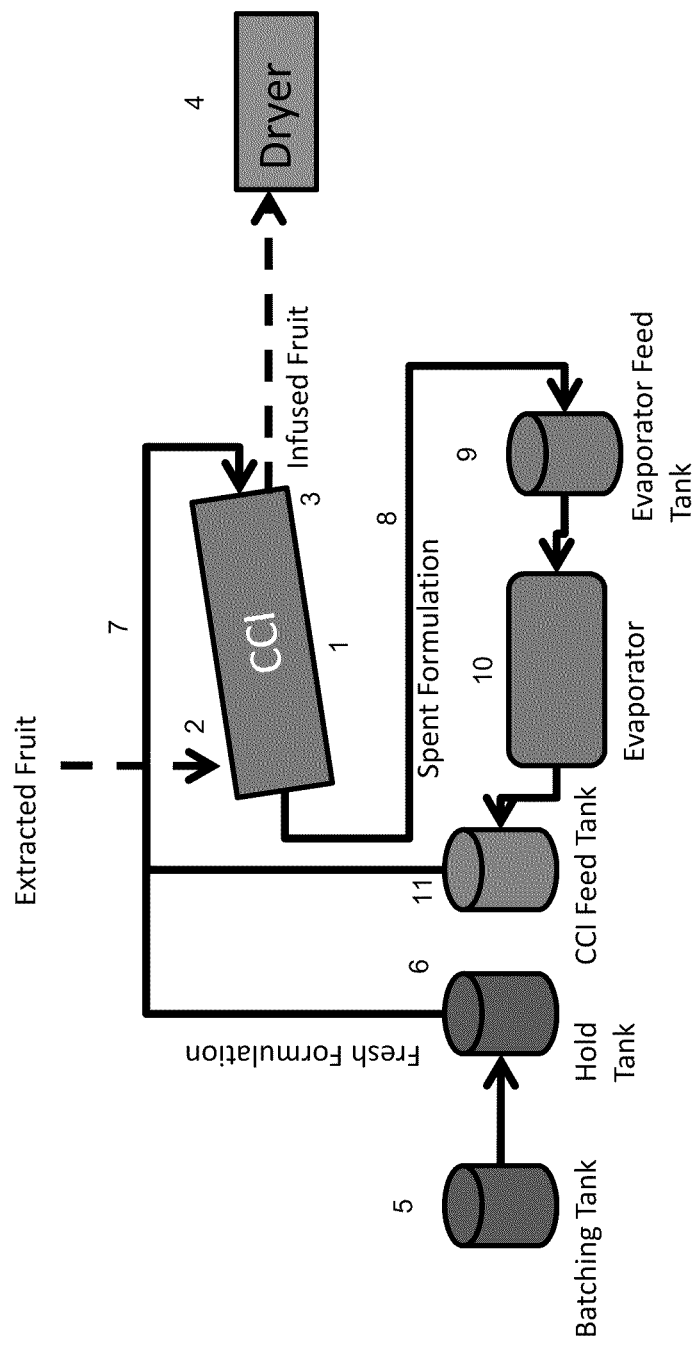

INFUSION METHODS AND PRODUCTS

CROSS REFERENCE TO RELATED APPLICATIONS

This application claims the benefit of U.S. Patent Application Nos. 61/321,377, filed on Apr. 6, 2010, and 61/349,155, filed on May 27, 2010, the entire contents of which are hereby incorporated by reference in their entireties.

TECHNICAL FIELD

This invention relates to improved methods for infusing food products with infusion formulations, such as soluble corn fiber and resistant maltodextrin.

BACKGROUND

Countercurrent infusers are used in the fruit processing industry for infusing fruit with infusion compositions. The infuser includes a screw conveyor which urges fruit solids in a first direction, while infusion fluid flows in the opposite direction. An exemplary infusion apparatus and methods of infusing fruit with infusion compositions is described in U.S. Pat. No. 5,419,251. A need exists for improved infusion methods that, e.g., provide infused products comprising increased levels of infusion compositions and/or infuse products with infusion compositions in less time than in conventional methods.

SUMMARY

The present specification is based, at least in part, on the discovery that food products can be efficiently infused (e.g., in less time and/or to a higher degree) using the methods and compositions described herein. In particular, applicants have found that infusing food bodies, e.g., cranberries, in an infusion apparatus using a relatively low viscosity infusion composition (alternatively referred to herein as an "infusion formulation"), e.g., comprising large polymeric molecules such as maltodextrin, and optionally at a relatively high flow rate, allows for rapid and efficient infusion of the composition into the food body. The infusion apparatus can be a countercurrent infusion apparatus (CCI). Accordingly, the present specification provides, e.g., a process for infusing food bodies, such as fruit and vegetables, with infusion compositions, e.g., comprising large molecules such as maltodextrin, e.g., resistant maltodextrin, soluble corn fiber, starch, other hydrocolloids such as gums, and/or peptides and soluble proteins, and also provides food products infused with such infusion compositions. Also provided are infusion formulations for performing such methods.

Accordingly, in one aspect, the invention provides a product that includes a food body comprising a food component and an infusion component. The infusion component can include an infusible molecule, e.g., a long chain molecule described herein. For example, the infusion component can include polysaccharides with an average degree of polymerization (DP) of greater than or equal to 15 (e.g., greater than or equal to 20, 25, 30, 35, 40, 45, 50, 55, 60, or greater than or equal to 70). Alternatively, or in addition, the infusion component can include a protein, e.g., a polypeptide, peptide, soluble protein, protein hydrolysate, and/or branched-chain protein. Exemplary proteins include, e.g., gelatin, whey protein, and soy protein. For example, the protein can comprise greater than or equal to 15 amino acid residues, (e.g., greater than or equal to 20, 25, 30, 35, 40, 45, 50, 55, 60, 65, 70, 75, 80, 85, 90, 95, or greater than or equal to 100 amino acid residues). Alternatively or in addition, the infusion component can include maltodextrin, e.g., resistant maltodextrin and/or soluble corn fiber. The long chain molecules can be present within the food body at about 5% to about 65%, e.g., about 10% to about 30%, by weight of the food body. In some instances, the long chain molecules can be present in the food body at about 20% to about 50%, or about 30% to about 60%. In some instances, the long chain molecules can be present in the food body at greater than 10% by weight. In other instances, the long chain molecules can be present in the food body at about 18% to about 25% by weight. In some instances, the total infusion formulation present in the food body is about 20% to about 90% by weight of the total finished food body, e.g., at least about 30% to about 90%, at least about 40% to about 90%, at least about 50% to about 90%, at least about 60% to about 90%, at least about 70% to about 90%, or at least about 80% to about 90%. In some instances, the total infusion formulation present in the food body can be about 90% to about 99% by weight, or greater than 99% by weight.

For example, the infusion component can include agarose; alginic acid and its derivatives; amylose; amylopectin; araban; arabinan; arabinogalactan; carageenan; cellulosic derivatives such as hemicelluloses, hydroxyl methyl propyl cellulose and carboxy methyl cellulose; soluble chitosan derivatives; dextran; fructans (with average DP ≥15) such as agave inulin and levans; galactomannan; galactan; poly galacturonic acid and its derivatives such as pectin, karaya, and tragacanth; gellan gum; glucans including beta-glucan, pullulan, lichenans, and lentinans; glucomannans, including cassia gum; glycogen; glycosaminoglycan and its derivatives; hyaluronic acid; maltodextrin including resistant maltodextrin; mannan; xanthan; xylan; xyloglucan; and/or hydrogenated starch hydrolysate.

In some instances, the food body can be a fruit body. The fruit body can be, e.g., a fruit selected from the group consisting of cranberry, blueberry, cherry, grape, mango, pineapple, raspberry, blackberry, date, apple, apricot, lingonberry, tomato, huckleberry, chokeberry, fig, gooseberry, elderberry, plum, prune, pear, and peach, among others.

In other instances, the food body can be a vegetable body. The vegetable body can be, e.g., a vegetable selected from the group consisting of a mushroom, celery, pepper, carrot, potato, cucumber, corn, onion, pea, and squash, among others.

In still other instances, the food body can be a legume body. The legume body can be, e.g., a legume selected from the group consisting of bean, pea, peanut and lentil, among others.

In another aspect, the invention provides a method of infusing a food body with an infusion formulation. The method includes, e.g., providing a food body from which at least a portion of the soluble solids, e.g., at least or about 5%, e.g., at least or about 10%, 20%, 30%, 40%, 50%, 60%, 70%, 75% 80%, 90%, or at least or about 98%, of soluble solids have been extracted; providing an infusion formulation having a viscosity of, e.g., about 100 cps to about 5000 cps, e.g., about 100 to about 3000 cps, e.g., about 1000 to about 5000 cps, e.g., about 1000 to about 2000 cps, e.g., at room temperature, and a dissolved solids content of, e.g., about 40 to about 75 brix, e.g., about 40 to about 65 brix; e.g., about 50 to about 75 brix; e.g., or about 50 to about 65 brix; infusing the food body with the infusion formulation in a countercurrent apparatus by advancing the food body along a path while flowing the infusion formulation countercurrently to the advancing food body, wherein the infusion formulation is provided to the countercurrent apparatus at an infusion formulation-to-food body weight/weight ratio of between about 1:1 to about 6:1, about 2:1 to about 6:1, about 3:1 to about 6:1, about 4:1 to about 6:1, about 4:1 to about 5:1, e.g., about 1.5:1, about 1.8:1, about 2:1, about 2.5:1, about 3:1, about 3.3:1, about 3.5:1, about 3.8:1, about 4:1, about 4.5:1, about 5:1, about 5.5:1; or about 6:1; and/or at a flow rate of, e.g., between about 10 gpm to about 40 gpm, e.g., between about 15 gpm to about 35 gpm, e.g., 16 gpm and about 32 gpm, e.g., about 20 gpm to about 30 gpm; and collecting the food body, to thereby produce an infused food body.

The residence time of the food body in the countercurrent apparatus can be any residence time deemed useful by the skilled practitioner. In some instances, the residence time is about 30 minutes to about 100 minutes. In other instances, the residence time can be, e.g., at least about 1 hour, e.g., at least about 1.5 hours, 2 hours, 3 hours, 4 hours, 5 hours, 6 hours, 7 hours, or greater than about 8 hours. Likewise, the temperature at which the infusion is performed can be selected by the skilled practitioner. In some instances, the infusion is performed at about room temperature, or about 60° F. to about 80° F., e.g., at about 65° F. to 75° F. In still other instances, the temperature can be, e.g., 120° F. to 130° F.

The infusion component can include a long chain molecule described herein. For example, the infusion component can include polysaccharides with an average degree of polymerization (DP) of greater than or equal to 15 (e.g., greater than or equal to 20, 25, 30, 35, 40, 45, 50, 55, 60, or greater than or equal to 70). Alternatively, or in addition, the infusion component can include a protein, e.g., a polypeptide, peptide, soluble protein, protein hydrolysate, and/or branched-chain protein. Exemplary proteins include, e.g., gelatin, whey protein, and soy protein. For example, the protein can comprise greater than or equal to 15 amino acid residues, (e.g., greater than or equal to 20, 25, 30, 35, 40, 45, 50, 55, 60, 65, 70, 75, 80, 85, 90, 95, or greater than or equal to 100 amino acid residues). Alternatively, or in addition, the infusion component can include maltodextrin, e.g., resistant maltodextrin and soluble corn fiber.

For example, the infusion component can include agarose; alginic acid and its derivatives; amylose; amylopectin; araban; arabinan; arabinogalactan; carageenan; cellulosic derivatives such as hemicelluloses, hydroxyl methyl propyl cellulose and carboxy methyl cellulose; soluble chitosan derivatives; dextran; fructans (with average DP ≥15) such as agave inulin and levans; galactomannan; galactan; poly galacturonic acid and its derivatives such as pectin, karaya, and tragacanth; gellan gum; glucans including beta-glucan, pullulan, lichenans and lentinans; glucomannans, including cassia gum; glycogen; glycosaminoglycan and its derivatives; hyaluronic acid; maltodextrin including resistant maltodextrin; mannan; xanthan; xylan; xyloglucan; and/or hydrogenated starch hydrolysate.

In some instances, the food body can be a fruit body. The fruit body can be, e.g., a fruit selected from the group consisting of cranberry, blueberry, cherry, grape, mango, pineapple, raspberry, blackberry, date, apple, apricot, lingonbery, tomato, huckleberry, chokeberry, fig, gooseberry, elderberry, plum, prune, pear, and peach, among others.

In other instances, the food body can be a vegetable body. The vegetable body can be, e.g., a vegetable selected from the group consisting of a mushroom, celery, pepper, carrot, potato, cucumber, corn, onion, pea, and squash, among others.

In still other instances, the food body can be a legume body. The legume body can be, e.g., a legume selected from the group consisting of bean, pea, peanut and lentil, among others.

In still another aspect, the invention provides an infusion formulation. The infusion formulation can include, at a minimum, long chain molecules as described herein. For example, the infusion formulation can include polysaccharides with an average degree of polymerization (DP) of greater than or equal to 15 (e.g., greater than or equal to 20, 25, 30, 35, 40, 45, 50, 55, 60, or greater than or equal to 70). Alternatively, or in addition, the infusion component can include a protein, e.g., polypeptides, peptides, soluble proteins, protein hydrolysates, and branched-chain proteins (e.g., gelatin, whey protein or soy protein). For example, the protein can comprise greater than or equal to 15 amino acid residues, (e.g., greater than or equal to 20, 25, 30, 35, 40, 45, 50, 55, 60, 65, 70, 75, 80, 85, 90, 95, or greater than or equal to 100 amino acid residues). Alternatively, or in addition, the infusion component can include maltodextrin, e.g., resistant maltodextrin and soluble corn fiber. For example, the infusion component can include agarose; alginic acid and its derivatives; amylose; amylopectin; araban; arabinan; arabinogalactan; carageenan; cellulosic derivatives such as hemicelluloses, hydroxyl methyl propyl cellulose and carboxy methyl cellulose; soluble chitosan derivatives; dextran; fructans (with average DP ≥15) such as agave inulin and levans; galactomannan; galactan; poly galacturonic acid and its derivatives such as pectin, karaya, and tragacanth; gellan gum; glucans including beta-glucan, pullulan, lichenans and lentinans; glucomannans, including cassia gum; glycogen; glycosaminoglycan and its derivatives; hyaluronic acid; maltodextrin including resistant maltodextrin; mannan; xanthan; xylan; xyloglucan; and/or hydrogenated starch hydrolysate.

In some embodiments, the infusion formulation can include, e.g., water, one or more types of sugar (e.g., sucrose, glucose, and/or fructose), a juice (e.g., cranberry juice and/or blueberry juice), a fruit syrup (e.g., pineapple syrup and/or agave nectar), honey, an organic acid (e.g., citric, tartaric, quinic, fumaric, malic and/or lactic acid) and/or a humectant (e.g., glycerol). In some embodiments, the infusion formulation can include, e.g., ribose, sucrose, dextrose, maltose, maltotriose, cellobiose, or sugar alcohols such as sorbitol, lactitol, xylitol etc., whey or soy protein hydrolysates, non-nutritive sweeteners, and/or emulsifiers such as mono and di-glycerides, polysorbates, etc. For example, in some embodiments, the infusion formulation can include by weight/weight about 10% to about 20% water, about 38% to about 50% soluble corn fiber, about 15% to about 35% sugar such as sucrose, about 5% to about 12% cranberry juice concentrate (50 Brix), about 0% to about 2% non-nutritive/low-calorie sweetener, and optionally, about 7.0% to about 16% glycerine. In some embodiments, the infusion formulation can have a viscosity of about 100 to about 5000 cps, e.g., about 100 to about 3000 cps, e.g., about 300 to about 3000 cps, e.g., about 400 to about 2000 cps, e.g., about 1000 to about 5000 cps, and have a content of about 10 to 65 brix. In some embodiments, the infused food bodies, e.g., infused cranberries, can have an infused solids content of at least or about 40 brix, e.g., at least or about 60, 65, 70, or at least or about 75 brix, before drying of the food body.

In one aspect, an infusion formulation, comprising by weight: 58% sucrose, 32% water, and 10% cranberry juice concentrate (50 Brix) is provided.

As used herein, the term "food body" means a unit of food, e.g., a fruit, vegetable, legume, or nut body, that retains its native structure at least in part, e.g., a fruit, vegetable, legume, or nut hull that is uncomminuted. A food body retains sufficient native structure to allow the food body to be infused with, and retain within its structure, a substantial amount of an infusion formulation described herein after the food body is removed from the infusion formulation (i.e., the body is capable of retaining infusion formulation at least about 0.1%, e.g., at least about 0.5%, 1%, 2%, 5%, 8%, 10%, 20% or at least about 30% (e.g., up to about 90%) total weight of the body after infusion). Thus, the term "food body" does not include purees, jellies, or juices. An exemplary body is a cranberry hull that has been subjected to extraction in a counter current extraction (CCE) apparatus, e.g., as described in U.S. Pat. No. 5,320,861. The terms "fruit body," vegetable body," "legume body" and "nut body" are types and examples of food bodies.

Unless otherwise defined, all technical terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, and other references mentioned herein are incorporated by reference in their entirety. In case of conflict, the present specification, including definitions, will control.

Other features and advantages of the invention will be apparent from the following detailed description and FIG-URE, and from the claims.

DESCRIPTION OF DRAWINGS

FIG. 1 depicts a flow diagram illustrating an exemplary procedure for infusing soluble corn fiber into cranberries.

DETAILED DESCRIPTION

A flow diagram is shown in FIG. 1 of an exemplary infusion procedure. In this exemplary procedure, a commercially available countercurrent apparatus is used, such as a countercurrent apparatus described in U.S. Pat. No. 5,320, 861. However, it will be understood by skilled practitioners that other infusion vessels may be used in the process. The process will be described for use with cranberries, although it may be adapted for use with many other types of fruit such as blueberries, cherries or grapes.

Exemplary Infusion Method

In an exemplary infusion method, cranberries that have been subjected to an extraction method to extract juice and which retain about 4% to about 30% of their soluble solids are supplied to a countercurrent infusion apparatus (CCI) 1. A CCI useful in the present methods includes an elongate trough-shaped housing with a helical screw conveyor intermittently rotated by a motor means, connected to a shaft on its longitudinal axis. The housing has an inlet 2 for the introduction of material to be infused, such as cranberries, and an outlet 3 at the other end of the trough housing is provided for removal of infused fruit. The inlet is disposed above the lower end of the screw, which is inclined slightly upwardly at an angle, e.g., of 2 to 6 degrees. The trough temperature may be controlled (e.g., by heating or cooling with a circulating water jacket positioned about the trough) to control the process temperature. Alternatively or in addition, the temperature of the fruit or the infusion formulation may be preselected prior to introduction to the extractor. The screw conveyor is operated by intermittently reversing the direction of rotation of the screw. The reversal helps the relatively compacted mass of matter being infused to be opened up enhancing the penetration of infusion formulation. Other details of a suitable CCI and methods are described in U.S. Pat. No. 4,363,264, the entire contents of which are hereby incorporated by reference. Commercially available units (e.g., CCE Model 1200, Millerbernd Systems, Winsted, Minn.) may be modified and operated with beneficial results. Infused fruit exits CCI 1 through outlet 3 and can optionally be moved to dryer 4, which passes forced air through the infused fruit product to remove water. Drying temperature is typically in the range of about 180° F. to 200° F. for about 120 minutes using a conventional forced air fruit dryer. The dried, infused fruit may optionally be passed to an oiler wherein vegetable oil or the like is applied to the fruit product to enhance flowability. The final dried infused product is collected and may be bulk packaged or packaged in pouches, e.g., for retail sale.

Liquid input to the CCI apparatus 1 is an infusion formulation, e.g., one described herein. The infusion formulation can be provided to the infuser by any method known in the art. For example, the formulation can be provided initially from a batching tank 5 which provides the formulation to a holding tank 6. Formulation flows from holding tank 4 to the CCI 1 via a charging line 7, which charges infusion formulation into the housing. Spent infusion formulation flows out of the CCI via a discharge line 8. The infusion formulation can be provided from a continuous process loop that mixes spent infusion formulation that has run through the CCI apparatus with fresh infusion formulation from a supply to produce a refreshed infusion formulation. For example, the infusion formulation can run through discharge line 8 to evaporator feed tank 9, which feeds spent infusion formulation to evaporator 10. After evaporation, infusion formulation flows to CCI feed tank 11. The infusion formulation from CCI feed tank 11 then mixes with fresh infusion formulation from hold tank 6, and is then fed back into CCI 1 to complete the process loop.

Infusion is carried out in the CCI apparatus under conditions that allow efficient infusion of infusion syrup, e.g., large molecules, into the fruit. The present methods employ relatively low viscosity infusion formulations. The relatively low viscosity infusion formulation is provided to the CCI apparatus at an infusion formulation-to-food body ratio of between about 1:1 to about 6:1, about 2:1 to about 6:1, about 3:1 to about 6:1, about 4:1 to about 6:1, about 4:1 to about 5:1, e.g., about 1.5:1, about 1.8:1, about 2:1, about 2.5:1, about 3:1, about 3.3:1, about 3.5:1, about 3.8:1, about 4:1, about 4.5:1, about 5:1, about 5.5:1; or about 6:1. Alternatively, or in addition, relatively high infusion formulation flow rates can be used in the present methods. For example, the infusion formulation can be provided to the CCI apparatus at a flow-through rate of about 10 gallons per minute (gpm) to about 40 gpm. For example, the flow-through rate can be, e.g., 13 gpm to about 25 gpm e.g., about 14 gpm to about 24 gpm, e.g., about 15 gpm to about 23 gpm, about 16 gpm to about 22 gpm, or about 18 gpm to about 20 gpm. Skilled practitioners will appreciate that the lower viscosity infusion formulations can allow higher flow-through rates, which is useful for infusing large molecules into the fruit. For example, in some embodiments, a flow-through rate of about 25 gpm to about 35 gpm, e.g., about 27 to about 33 gpm, or about 29 to about 31 gpm, or about 13 gpm to about 30 gpm can be used. For example, in some embodiments, a flow-through rate of about 35 gpm or greater than 35 gpm can be used. The viscosities of certain infusion formulations useful in the present invention are described in detail below.

The residence time of the fruit in the CCI apparatus can vary as necessary. Skilled practitioners will appreciate that increased residence times may allow for increased levels of infusion, e.g., depending upon the equipment used in the methods. In some embodiments, the residence time is about 50 to about 80 minutes, e.g., about 40 to about 60 minutes, or about 45 to about 55 minutes. In other embodiments, a residence time of greater than 1 hour, e.g., about 1 hour to about 12 hours may be used, e.g., about 2 hours to about 3 hours, e.g., about 2 hours, may be used, as can a residence time of about 8 hours to about 10 hours.

The temperature at which infusion is performed may be close to room temperature, e.g., about 65° F. to about 80° F. Skilled practitioners will appreciate that lower or higher temperatures may be used in certain situations. For example, infusions may be performed at higher temperatures, e.g., about 120° F. to about 130° F. As discussed above, the temperature at which infusion is performed can be controlled by any means known in the art, e.g., by controlling the trough temperature, the fruit temperature, and/or the infusion formulation temperature.

Infusion Formulations

Included in the present invention are various low viscosity infusion formulations. Applicants have determined surprisingly that a relatively low viscosity of the infusion formulation and optionally a relatively high flow rate of the infusion formulations, e.g., through an infuser and over food bodies, allows for rapid and efficient infusion of the formulation into the food bodies. Accordingly, in some instances, the formulation can have a viscosity of between about 100 to about 5000 cps. For example, the formulation can have a viscosity of about 100 to about 3000, e.g., about 500 to about 2500 cps, e.g., about 1000 to about 2000 cps, e.g., about 1000 to about 5000 cps. In some embodiments, the infusion formulation can have a viscosity of about 1000 cps, about 1500 cps, or about 2000 cps. In some embodiments, the formulation can have a viscosity as low as 25 cps, e.g., when infusing at higher temperature, e.g., between 100° F. to 140° F.

The infusion formulations of the present invention can have a dissolved solids content of, e.g., about 10 to about 65 brix, e.g., about 40 to about 80 brix, e.g., about 40 to about 75 brix, or about 50 to about 70 brix, e.g., about 55 to about 65 brix. For example, in some embodiments, the infusion formulation has a dissolved solids content of about 45 to 55 brix, about 60 brix, about 65 brix, or about 65 to about 75 brix.

Formulations can include an aqueous solution, such as water. Further, infusion formulations can include a sugar. Sugars that can be included in a formulation include, for example, glucose, ribose, sucrose, fructose, dextrose, maltose, maltotriose, and/or cellobiose. Alternatively or in addition, a sugar alcohol can be included. Exemplary sugar alcohols include sorbitol, lactitol, xylitol, mannitol, maltitol, isomalt, glycerol, erythritol, and/or arabitol. Alternatively or in addition, a juice can be included. Skilled practitioners will appreciate that any juice can be included depending upon the characteristics desired for the product. For example, cranberry juice, blueberry juice, and/or cherry juice can be added, e.g., in concentrated form. Alternatively or in addition, the formulation can include a non-nutritive sweetener such as Stevia, Aspartame, Sucralose, Luo Han Guo, and/or Erythritol.

The formulations can include infusible molecules, e.g., long chain molecules. In some embodiments, the formulations may include a polysaccharide, such as inulin or resistant maltodextrin, e.g., soluble corn fiber. For polysaccharides, an infusible long chain molecule is one with an average degree of polymerization (DP) of greater than or equal to 15. For example, the infusible molecules, e.g., long chain molecules, can have an average degree of polymerization of at least 20, 25, 30, 35, 40, 45, 50, 55, 60, 65, or greater than 70. Generally, exemplary polysaccharides that can be included in the formulation include inulin; agarose; alginic acid and its derivatives; amylose; amylopectin; araban; arabinan; arabinogalactan; carageenan; cellulosic derivatives such as hemicelluloses, hydroxyl methyl propyl cellulose and carboxy methyl cellulose; soluble chitosan derivatives; dextran; fructans (with average DP ≥15) such as agave inulin and levans; galactomannan; galactan; poly galacturonic acid and its derivatives such as pectin, karaya, and tragacanth; gellan gum; glucans including beta-glucan, pullulan, lichenans and lentinans; glucomannans, including cassia gum; glycogen; glycosaminoglycan and its derivatives; hyaluronic acid; maltodextrin including resistant maltodextrin; mannan; xanthan; xylan; xyloglucan; and hydrogenated starch hydrolysate, among others. In some instances, an infusible molecule can be a protein, e.g., a polypeptide, peptide, soluble protein, protein hydrolysate, and/or branched-chain protein. Exemplary proteins include, e.g., gelatin, whey protein, and soy protein. For example, the protein can comprise greater than or equal to 15 amino acid residues, (e.g., greater than or equal to 20, 25, 30, 35, 40, 45, 50, 55, 60, 65, 70, 75, 80, 85, 90, 95, or greater than or equal to 100 amino acid residues), and/or globulin. Other examples are described throughout the specification.

For example, a formulation may contain maltodextrin, resistant maltodextrin, and/or soluble corn fiber. The term "maltodextrin" is a term used in the art and recognized by skilled practitioners. Generally, maltodextrins are glucose polymers mostly linked in 1→4 with only 4 to 5% glucosidic linkages 1→6, are soluble in water and have low reducing power. Resistant maltodextrin is known in the art. An exemplary resistant maltodextrin is commercially available as FIBERSOL®-2 (Matsutani Chemical Industry Co., Ltd). Another example of resistant maltodextrin is soluble corn fiber. An exemplary soluble corn fiber is commercially available as PROMITOR™ Soluble Corn Fiber (Tate & Lyle PLC, London UK). Generally, soluble corn fiber may be produced by concentrating corn syrup and causing the dextrose molecules therein to form long chain polysaccharides that are resistant to digestion in the human stomach. Alternatively or in addition, the formulation can include polysaccharides such as starch, hemi-celluloses or other hydrocolloids, such as pectin or other gums (e.g., Guar, Gum Acacia, Locust Bean, Carob, Xanthan, Gellan, Konjac, Carrageenan, Gum Karaya), or a soluble protein or protein hydrolysate. In some embodiments, the formulations can include mixtures of infusible molecules described herein, e.g., any of the long chain molecules described herein and/or fused/hybrid forms of any of the long chain molecules described herein.

Skilled practitioners will appreciate that the infusion formulation can include any number of other useful ingredients, e.g., materials to improve the appearance, taste, or nutritional properties of the product. For example, the infusion formulation may include flavoring other than sugar, e.g., spices such as cinnamon, mint, and/or peppermint, and may include nutritionally valuable components, such as vitamins, e.g. ascorbic acid, and/or minerals, e.g. iron and/or calcium.

Skilled practitioners will also appreciate that in order to improve the mouth feel and/or the texture of the food body, or to improve the functionality of the food body, plasticizers/humectants such as glycerol, erythritol, sorbitol, fructose, dextrose, fructo-oligosaccharides (FOS), galacto-oligosaccharides (GOS), monoglycerides, propylene glycol, lactic acid, and/or glyceryl triacetate can be added to the infusion formulation.

Products

The methods described herein can provide a large number of infused products. An infused product typically includes a food component (i.e., the natural and/or endogenous material of the infused food product, e.g., a fruit hull, such as a cranberry or blueberry hull or a vegetable hull) and an infusion component (i.e., an exogenously-added infusion formulation described herein). In some instances, the infused product will include a fruit (e.g., cranberry or blueberry) hull that comprises within it infusion formulation, wherein the infusion formulation occupies (e.g., partially or completely) one or more voids left within the fruit hull as a result of the fruit being treated in an extraction process (e.g., squeezing and/or countercurrent extraction) prior to being treated with the presently-described infusion process.

For example, any type of fruit, vegetable, or legume body that can be infused with an infusion formulation and retain a substantial amount of the infusion formulation within the body (i.e., retain infusion formulation at least about 0.1%, e.g., at least about 1%, 2%, 5%, 8%, 10%, 20% or at least about 30% total weight of the food body after infusion) after removal of the food body from the infusion formulation, can be used and is included in the invention in its infused form.

In particular, any type of food body, e.g., cranberries, infused according to a process described herein, such as cranberries infused with long chain molecules, e.g., maltodextrin, resistant maltodextrin, soluble corn fiber, pectin, a protein, e.g., a polypeptide, peptide, soluble protein, protein hydrolysate, branched-chain protein, and/or guar gum, are within the present invention. Exemplary fruit bodies include, but are not in any way limited to, cranberries, blueberries, cherries, grapes, mangos, pineapples, raspberries, blackberries, dates, apples, apricots, lingonberries, tomatoes, huckleberries, chokeberries, figs, gooseberries, elderberries, plums, prunes, pears, peaches, and the like. Exemplary vegetable bodies include, but are not limited to, mushrooms, celery, peppers, carrots, potatoes, cucumbers, corn, onions, peas, squash and the like. Exemplary legume bodies include, but are not limited to, beans (e.g., kidney, fava, pinto, and black beans), peas, lentils, and peanuts. Exemplary nut bodies include, e.g., cashews, almonds, and macadamia.

The infused food bodies can be, e.g., infused dried fruit, for example sweetened dried cranberries with plumper and juicier texture. In some embodiments, the infused food bodies, e.g., infused cranberries, will have infused solids content of at least or about 40 brix, e.g., at least or about 50, 55, 60, 65, 70, or at least or about 75 brix, before drying of the food body.

In some instances, the infused food bodies may be characterized by a long chain molecule (e.g., soluble corn fiber or maltodextrin) content of at least or about 1% by weight. For example, the infused food bodies can have a long chain molecule content ranging from about 1% to about 65%, e.g., about 5% to 50% or about 10% to 20%. In some embodiments, the infused food bodies can have a long chain molecule content of about 15% to about 35%, e.g., about 20% to about 25%, e.g., a content of at least or about 10%. In certain embodiments, the infused food bodies are infused with one type of long chain molecule. However, it is also contemplated that mixed infusions can be performed, e.g., wherein more than one long chain molecule is infused, e.g., a mixture of any combination of molecules described herein is infused, or wherein fused/hybrid forms of infusible molecules, e.g., the long chain molecules described herein, are infused. In these instances, mixed infusion formulations comprising long chain molecules, non-long chain molecules, and mixtures thereof may be used. Infused food bodies, comprising a mixture of long chain molecules wherein the total long chain molecule content is as described herein, are also within the present invention. In some instances, the infusion formulation may comprise from about least about 0.1%, e.g., at least about 0.5%, 1%, 2%, 5%, 8%, 10%, 20% 30%, 40%, 50%, 60%, 70%, 80%, 90%, or at least about 98%, of the total weight of the infused food body. The infused food bodies can be in dried, semi-dried, or non-dried form.

Also encompassed are food products that include the infused food bodies. For example, the food products can be included as an ingredient in ready to eat cereals. Such food products can also be in the form of a mass, e.g., a cereal bar. Infused fruit can be admixed with cereal and formed into a bar such as with a binder. In some embodiments, the bars can include a separate layer or region that includes the infused fruit.

The infused food bodies can also be added to products such as fruit cups, baked goods, confections (e.g., chocolates), and salads (e.g., prepackaged salads and salad kits).

The infused food bodies can be added to a variety of other food products such as dry mixes for baked goods, snack or trail mixes. For infused vegetables, the bodies can be added to a variety of dry mixes to provide finished cooked products with, e.g., higher fiber levels. For example, dried infused vegetables can be added to dry mixes for soups or to add-meat dinner dry mixes.

The infused food bodies are also suitable for inclusion into a wide variety of dairy products. For example, the infused fruit bodies can be added to yogurt to provide products that not only provide the nutrition and taste appeal of fruit but also provide high levels of fiber. Also, the food bodies can be added to a variety of frozen dairy products such as ice cream or soft serve frozen dairy products. The fruit products can be added to nondairy frozen desserts such as sorbets or frozen fruit bars.

Examples

Several general exemplary formulations are described below, which may be used in any of the methods described herein and do not limit the scope of the invention described in the claims. All percentage values are provided on a weight/weight basis:

Formulation A

| | |
|---|---|
| 1. Sugar | 40-60% |
| 2. Cranberry Concentrate (50 Brix) | 5-20% |
| 3. Water | To adjust Brix |

Infusion syrup Brix=65
Infusion syrup viscosity <1000 cps @ Room Temperature
Formulation B

| | |
|---|---|
| 1. Sugar | 30-50% |
| 2. Cranberry Concentrate (50 Brix) | 0-15% |

-continued

| 3. Maltodextrin | 5-15% |
|---|---|
| 4. Glycerin (Optional) | 0-10% |
| 5. Water | To adjust Brix |

Infusion syrup Brix=60
Infusion syrup viscosity <1500 cps @ Room Temperature
Formulation C

| 1. Corn Syrup or Corn Syrup Solids | 20-70% |
|---|---|
| 2. Fruit Juice Concentrate | 0-20% |
| 3. Hydrogenated Starch hydrolysates | 0-20% |
| 4. Water | To adjust Brix |

Infusion syrup Brix=45-55
Infusion syrup viscosity <1500 cps @ Room Temperature
Formulation D

| 1. Corn Syrup or Corn Syrup Solids | 40-70% |
|---|---|
| 2. Fruit Juice Concentrate | 0-20% |
| 3. Erythritol | 0-10% |
| 4. Maltitol | 0-10% |
| 5. Water | To adjust Brix |

Infusion syrup Brix=65-75
Infusion syrup viscosity <2000 cps @ Room Temperature
Formulation E

| 1. Sugar | 0-65% |
|---|---|
| 2. Fiber (e.g., soluble corn fiber) | 1-65% |
| 3. Glycerine | 0-65% |
| 4. Water (e.g., from juice or relatively pure water) | 20-75% |

Formulation F

| 1. Starch/maltodextrin | 5-45% |
|---|---|
| 2. Glycerine | 0-20% |
| 3. Non-nutritive/low calorie sweetener | 0-1% |
| 4. Water (e.g., from juice or relatively pure water) | 20-75% |
| 5. Citric acid | 0-2% |

Formulation G

| 1. Fiber (e.g., hydrolyzed guar gum) | 1-65% |
|---|---|
| 2. Glycerine | 0-20% |
| 3. Non-nutritive/low calorie sweetener | 0-2% |
| 4. Water (e.g., from juice or relatively pure water) | 20-75% |
| 5. Malic acid | 0-2% |

Formulation H

| 1. Starch/maltodextrine | 1-45% |
|---|---|
| 2. Erythritol | 0-40% |
| 3. Non-nutritive/low calorie sweetener | 0-1% |
| 4. Water (e.g., from juice or relatively pure water) | 20-75% |
| 5. Lactic acid | 0-2% |

Formulation I

| 1. Fiber (e.g., resistant maltodextrin) | 1-65% |
|---|---|
| 2. Pineapple syrup | 0-40% |
| 3. Glycerine | 0-20% |
| 4. Water (e.g., from juice or relatively pure water) | 20-75% |
| 5. Citric acid | 0-10% |

Formulation J

| 1. Fiber (e.g., soluble corn fiber, 72 Brix) | 1.05 kg |
|---|---|
| 2. Sucrose | 0.69 kg |
| 3. Glycerine | 0.21 kg |
| 4. Water (e.g., from juice or relatively pure water) | 0.46 kg |
| 5. Cranberry Concentrate (50 Brix) | 0.21 kg |

Formulation K

| 1. Water | 17% |
|---|---|
| 2. Soluble corn fiber | 43% |
| 3. Sugar | 23.5% |
| 4. Cranberry Concentrate | 7.0% |
| 5. Glycerine | 9.5% |
| 6. Non-nutritive/low calorie sweetener | 0-0.3% |

Formulation L

| 1. Water | 16.5% |
|---|---|
| 2. Soluble corn fiber | 43% |
| 3. Sugar | 21% |
| 4. Cranberry Concentrate | 7.0% |
| 5. Glycerine | 12.5% |

Formulation M

| 1. Water | 19.5% |
|---|---|
| 2. Soluble corn fiber | 30.5% |
| 3. Sugar | 30% |
| 4. Cranberry Concentrate | 7.5% |
| 5. Glycerine | 12.5% |

For example, in one embodiment, the formulation includes by weight water: about 18%; soluble corn fiber: about 40%; sucrose: about 26%; cranberry juice concentrate type (50 brix): about 8.0%; and glycerine: about 8.0%.

In another embodiment, the formulation includes by weight water: about 25%; maltodextrin: about 35%; sucrose: about 20%; cranberry juice concentrate (50 brix): about 10%; and erythritol: about 20%.

In another embodiment, the formulation includes by weight water: about 40%; hydrolyzed guar gum: about 30%; sucrose: about 18%; cranberry juice concentrate (50 brix): about 6%; glycerol: about 6%; and sucralose: about 0.01%.

In another embodiment, the formulation includes by weight water: about 50%; hydrolyzed guar gum: about 10%; maltodextrin: about 28%; glycerol: about 10.8%; and sucralose: about 0.01%; citric acid: about 1.2%.

In another embodiment, the formulation includes by weight water: about 60%; soy protein isolate: about 8%; and sucrose: about 32%.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of producing an infused food body comprising:
   providing a food body comprising a cranberry hull from which at least about 40% to about 98% of soluble solids have been extracted;
   infusing the food body with an infusion formulation comprising maltodextrin and having a viscosity of as low as about 25 cps and up to about 1000 cps and a dissolved solids content of about 10 to 65 brix in a countercurrent apparatus by advancing the food body along a path while flowing the infusion formulation countercurrently to the advancing food body at a flow rate of between about 10 gpm and about 40 gpm, wherein the infusion formulation is provided to the countercurrent apparatus at an infusion formulation-to-food body weight/weight ratio of between about 1:1 to about 6:1; and
   collecting the food body, to thereby a produce an infused food body.

2. The method of claim 1, wherein the residence time of the food body in the countercurrent apparatus is about 30 minutes to about 100 minutes.

3. The method of claim 1, wherein the infusion is performed at about room temperature.

4. The method of claim 1, wherein the infusion formulation comprises polysaccharides having an average DP of greater than or equal to 15.

5. The method of claim 1, wherein the infusion formulation further comprises protein hydrolysates selected from the group consisting of: gelatin, whey protein, and soy protein.

6. The method of claim 1, wherein the infusion formulation further comprises polysaccharides selected from the group consisting of: agarose; alginic acid and its derivatives; amylose; amylopectin; araban; arabinan; arabinogalactan; carageenan; cellulosic derivatives; soluble chitosan derivatives; resistant maltodextrin; soluble corn fiber; dextran; fructans with average DP $\geq 15$; galactomannan; galactan; poly galacturonic acid and its derivatives; gellan gum; glucans; glucomannans; glycogen; glycosaminoglycan and its derivatives; hyaluronic acid; maltodextrin; mannan; xanthan; xylan; and xyloglucan.

7. The method of claim 1, wherein the infused food body retains infusion formulation at greater than 10% total weight of the food body.

8. The method of claim 1, wherein the infusion formulation has a viscosity of about 100 cps.

9. The method of claim 1, wherein the flow rate is between about 15 gpm and about 35 gpm.

10. The method of claim 1, wherein the infusion formulation is present within the food body at about 50% to about 90% by weight of the food body.

11. The method of claim 1, wherein the infusion formulation has a viscosity of about 500 cps.

12. The method of claim 1, wherein the infusion formulation has a viscosity of about 1000 cps.

* * * * *

UNITED STATES PATENT AND TRADEMARK OFFICE
CERTIFICATE OF CORRECTION

PATENT NO. : 10,004,242 B2  
APPLICATION NO. : 13/081344  
DATED : June 26, 2018  
INVENTOR(S) : Soumya Roy et al.

Page 1 of 1

It is certified that error appears in the above-identified patent and that said Letters Patent is hereby corrected as shown below:

On the Title Page

Item (*) (Notice), Line 3, after "0 days." delete "days.";

In the Claims

In Column 14, Line 8, in Claim 6, delete "carageenan;" and insert -- carrageenan; --.

Signed and Sealed this  
Twenty-fifth Day of December, 2018

Andrei Iancu  
*Director of the United States Patent and Trademark Office*